March 23, 1954 W. G. GREEN 2,672,750
APPARATUS FOR CALIBRATING PRESSURE GAUGES
Filed May 9, 1951
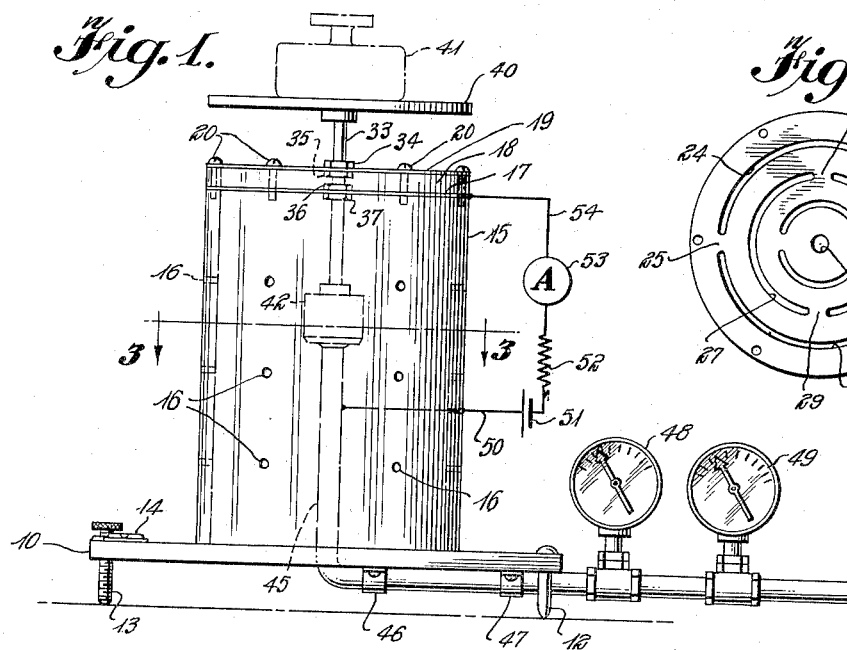
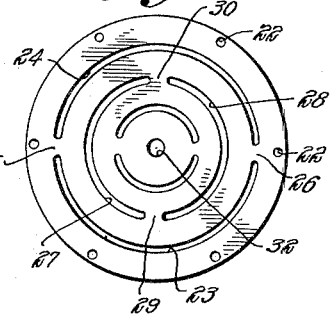
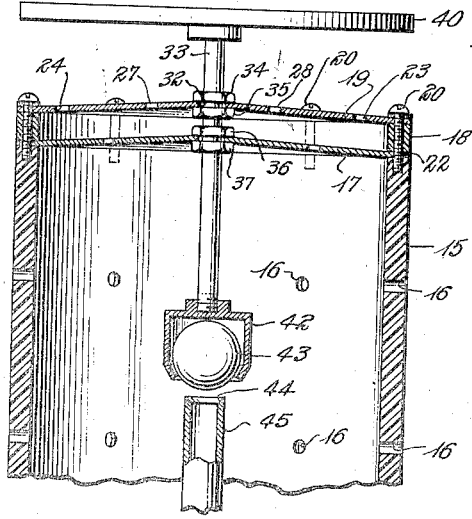
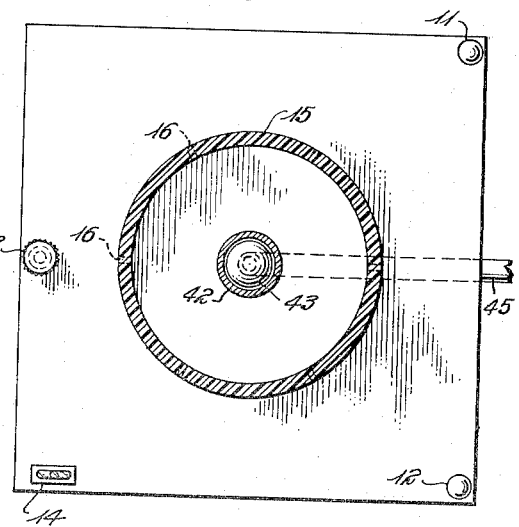
INVENTOR
William G. Green
BY Stevens, Davis, Miller and Mosher
ATTORNEYS Patented Mar. 23, 1954

2,672,750

UNITED STATES PATENT OFFICE 2,672,750

APPARATUS FOR CALIBRATING PRESSURE GAUGES

William G. Green, Denison, Tex., assignor to A. V. Dayton Engineering Corp., Tulsa, Okla., a corporation of Texas Application May 9, 1951, Serial No. 225,321

2 Claims. (Cl. 73—4)

This invention relates to apparatus for calibrating fluid pressure gages and more particularly to an apparatus for calibrating a fluid pressure gage by the direct weighing of the pressure applied to the gage.

The idea of calibrating the pressure gage by directly weighing the pressure applied to the gage is not new and the invention here involved relates rather to a specific construction for the accomplishment of this type of gage calibration rather than to any broad principle. The specific construction here illustrated and described has been found to be particularly efficient and accurate and therefore desirable. However, in spite of the fact that this invention is concerned with a specific construction, it will at once be apparent to those skilled in the art that a number of modifications may be made without departing from the spirit and scope of this invention.

One of the more important features of this invention is the application of the pressure to be weighed to the seat of a ball valve so that the pressure will act to lift the ball. The ball is then weighted by resting a calibrating weight table freely upon it and when pressure is applied sufficient to raise the ball from its seat, the exact amount of pressure can be accurately determined from the knowledge of the area of the ball which is exposed to the pressure plus a knowledge of the exact weight of the ball and parts resting upon it.

A further important feature of this invention is the use of an electrical circuit extending through the ball and its seat to determine when the ball is lifted from its seat by the pressure. A still further important feature of this invention is the use of a pair of thin, multiple-slotted plates as anti-friction guides for the calibrating weight table.

Other details and advantages of this invention will be apparent from the following detailed description of the drawings which illustrate the preferred embodiment.

In the drawings,

Figure 1 is a side elevational view of a device constructed in accordance with this invention, with the electrical circuit schematically illustrated.

Figure 2 is an enlarged view of a portion of Figure 1 with certain parts in section to more clearly illustrate their construction.

Figure 3 is a plan view, in section, of the construction shown in Figure 1, the view being taken on lines 3—3 of Figure 1.

Figure 4 is a plan view of one of the slotted guide plates used in the construction shown in Figure 1.

As illustrated in Figure 1, the device of this invention is built upon a base plate 10 which is adapted to be supported from any suitable surface by a pair of fixed legs 11 and 12 and an adjustable leg 13, which as illustrated, is a thumb screw extending through the base plate 10 and bearing against the supporting surface. A level 14 may be mounted on the base plate to aid in adjusting the base plate to a level position so that the operation of the device will be uniform when it is moved from one place to another.

Upon the base plate 10 is mounted a vertically extending cylinder 15 preferably of some sort of plastic so that the operation of the parts inside can be seen. A number of holes 16 are preferably drilled in this cylinder 15 so that air or other gas used in the calibration may easily escape. The cylinder 15 may be fastened to the base plate 10 by any suitable means. At the top of the cylinder 15 there is placed a very thin, multiple-slotted disc 17. On top of this disc is placed a short cylinder or ring of plastic material 18 and then on top of this short cylinder or ring, which serves as a spacer ring, is placed another thin, multiple-slotted disc 19 which is the same as or similar to disc 17. The two discs 17 and 19 and the spacer ring 18 are all held on top of the main cylinder 15 by a series of machine screws 20 that extend through the top disc 19, the spacer ring 18, the bottom disc 17 and into the cylinder 15.

By reference to Figure 4, it will be seen that the multi-slotted discs 17 and 19 are provided with a series of holes 22 near their outer edges to receive the fastening screws 20 and are then provided with a series of arcuate slots so arranged that the center of the disc will be held against radial movement in any direction but will be quite free for axial movement. Thus, there are two outer arcuate slots 23 and 24 which together almost completely encircle the disc and leave only the small metal connections 25 and 26 to connect the inner part of the disc with the outer part of the disc. Progressing inwardly the next pair of arcuate slots 27 and 28 leave only the small metal connections 29 and 30 connecting the disc inside the slots to the disc outside the slots and these small metal connections 29 and 30 are offset 90° from the first-mentioned small metal connections 25 and 26. Then, again, a third pair of slots still further frees the center of the disc for axial movement.

In the very center of the disc is an opening 32 and when the device is assembled a vertical rod 33 extends through the opening 32 in the center of each of the two multi-slotted guide discs 17 and 19. This rod 33 is threaded where it extends through the openings 32 and a series of nuts 34, 35, 36, and 37 are arranged thereon to lock the rod in position in the center of the two discs 17 and 19 and hence in a vertical position in the center of the main cylinder 15.

Upon the upper end of the rod 33, and above the construction thus far described, a calibrating weight supporting table 40 is permanently mounted. On this table may rest whatever calibrating weight 41 it is desired to use for the particular calibration.

On the lower end of the rod 33, there is permanently mounted a ball cage 42 in which there is contained a ball valve 43. The ball valve is loosely held in the cage so that it is free for rotation and free for any movement that is necessary for it to seat firmly on a ball seat 44 which is positioned immediately beneath it. When the ball valve 43 is positioned on the seat the cage 42 rests loosely on top of the ball so that the ball thus supports the calibrating weight table and the calibrating weight.

The valve seat 44 and the ball valve 43 are carefully fitted so as to assure a minimum of leakage when the valve is closed. The ball seat is a part of a tubular member 45 which extends through the base plate 10 and then along the underside of the base plate 10 where it is fastened by clamps 46 and 47. From this point suitable connections are made to a pressure gage 48 which is undergoing test to an already calibrated pressure gage 49, used for general comparison, and to a source of pressure (not shown).

No effort has been made to show accurately or in detail the particular connections to the two pressure gages or to the source of pressure for this may vary widely in different installations and is well within the skill of those familiar with the art.

The device as thus far described can be satisfactorily used to calibrate pressure gages, for the unseating of the ball on its seat can be observed both by its motion and by the slight loss of pressure. However, for very accurate work it is desirable to include in the device an electrical circuit such as is schematically shown in Figure 1. This circuit extends from the valve seat 44 through a portion of the pressure tubing 45, then through a conductor 50 to one end of a battery 51. From the other end of the battery 51, the circuit extends through a resistor 52 and an ammeter or galvanometer 53 to a conductor 54 which connects it to the lower guide plate 17. From this guide plate 17 the circuit extends through the rod 33 and the cage 42 to the ball valve 43 so that the circuit is completed when the ball valve rests on the seat 44 but is broken when the ball valve is lifted by pressure from this seat.

As previously stated, the present invention resides to a considerable extent in the specific construction herein disclosed, but numerous modifications can be made within the scope of this invention. For example, a calibrating weight supporting platform may be suspended below the ball valve in such a way that the diaphragm-type of guides 17 and 19 may be eliminated. This makes the device slightly more sensitive but also makes it somewhat more delicate.

What is claimed is:

1. An apparatus for calibrating pressure gages comprising a ball valve, a valve seat for co-operation with said ball valve and in vertical alignment therewith, a cage surrounding said ball valve and retaining said ball valve against independent vertical movement and against horizontal movement but permitting free rotary movement of said ball valve to insure accurate seating against said valve seat, a rod attached to and projecting upward from said cage, a calibrating weight table mounted on the upper end of said rod, a selectively variable weight on said table, a tubular member containing said valve seat at its upper end connected to a pressure source at its opposite end, means for connecting a pressure gage to be tested to said tubular member and a second standard pressure gage connected to said tubular member between said valve seat and said pressure source, a horizontally supported vertically extending cylinder surrounding said valve seat and said cage, a pair of vertically spaced flexible discs associated with the top of said cylinder and attached to said rod, said discs including a series of concentric pairs of arcuate slots, each pair of said slots pairs being offset 90° from the next successive pair to permit vertical movements of said discs with said rod whereby pressure in said tubular member will raise said ball valve and associated members including said cage, rod, discs, and table off said valve seat in a vertical direction when the pressure exceeds the combined resistance of said associated members and said selectively variable weight.

2. An apparatus for calibrating pressure gages as defined in claim 1 wherein said tubular member, valve seat, ball valve and associated members are all made of conducting material, and whereby in an electric circuit is attached to one end to one of said discs and at the other end to said tubular member, and said circuit comprising an ammeter, a resistance, and a power source, whereby said circuit is broken when said ball valve raises off said valve seat.

WILLIAM G. GREEN.

References Cited in the file of this patent

UNITED STATES PATENTS

| Number | Name | Date |
|---|---|---|
| 720,375 | Nageldinger | Feb. 10, 1903 |
| 1,134,316 | Collette | Apr. 6, 1915 |
| 1,230,289 | Gebhardt | June 19, 1917 |
| 1,650,736 | Zelov | Nov. 29, 1927 |
| 2,013,252 | Pigott | Sept. 3, 1935 |
| 2,318,724 | Temple | May 11, 1943 |

FOREIGN PATENTS

| Number | Country | Date |
|---|---|---|
| 41 | Great Britain | Jan. 3, 1878 |